(12) United States Patent
Hamachi et al.

(10) Patent No.: US 11,356,029 B2
(45) Date of Patent: Jun. 7, 2022

(54) RECTIFYING CIRCUIT AND SWITCHED-MODE POWER SUPPLY INCORPORATING RECTIFYING CIRCUIT

(71) Applicant: ROHM Co., LTD., Kyoto (JP)

(72) Inventors: Kenji Hamachi, Kyoto (JP); Akeyuki Komatsu, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 2 days.

(21) Appl. No.: 16/916,954

(22) Filed: Jun. 30, 2020

(65) Prior Publication Data

US 2021/0006173 A1   Jan. 7, 2021

(30) Foreign Application Priority Data

Jul. 3, 2019   (JP) .............................. JP2019-124346
Mar. 18, 2020   (JP) .............................. JP2020-048074

(51) Int. Cl.
| | | |
|---|---|---|
| *H02H 3/33* | (2006.01) | |
| *H02M 3/335* | (2006.01) | |
| *H02M 1/08* | (2006.01) | |
| *H02M 1/32* | (2007.01) | |
| *H02M 1/12* | (2006.01) | |
| *H02M 1/42* | (2007.01) | |
| *H02M 1/00* | (2006.01) | |

(52) U.S. Cl.
CPC ......... H02M 3/33592 (2013.01); H02M 1/08 (2013.01); *H02M 1/0009* (2021.05); *H02M 1/0058* (2021.05); *H02M 1/12* (2013.01); *H02M 1/32* (2013.01); *H02M 1/4208* (2013.01)

(58) Field of Classification Search
CPC .......... H02M 3/33592; H02M 1/0009; H02M 1/0058; H02M 1/08; H02M 1/12; H02M 1/32; H02M 1/4208
USPC ...................................................... 363/21.01
See application file for complete search history.

(56) References Cited

U.S. PATENT DOCUMENTS

| | | | | |
|---|---|---|---|---|
| 5,991,171 A | * | 11/1999 | Cheng ............... | H02M 3/33507 363/21.03 |
| 2009/0196075 A1 | * | 8/2009 | Arduini ................ | H02M 3/335 363/21.06 |
| 2011/0133722 A1 | * | 6/2011 | Halberstadt ......... | H02M 3/3382 324/76.11 |

FOREIGN PATENT DOCUMENTS

| | | |
|---|---|---|
| JP | 5007966 B2 | 8/2012 |
| JP | 2019009989 A | 1/2019 |

* cited by examiner

*Primary Examiner* — Yemane Mehari
(74) *Attorney, Agent, or Firm* — Chip Law Group

(57) ABSTRACT

Disclosed are a rectifying circuit and a switched-mode power supply. The rectifying circuit includes a first rectifying section for rectifying a positive induced voltage generated across a secondary winding of a transformer, a second rectifying section for rectifying a negative induced voltage generated across the secondary winding, and an inductance section connected between the first rectifying section and the second rectifying section. The switched-mode power supply includes a transformer having a primary winding and a secondary winding, a drive circuit for switchingly driving the primary winding of the transformer, and the rectifying circuit connected to the secondary winding of the transformer.

12 Claims, 15 Drawing Sheets

RECTIFYING CIRCUIT AND SWITCHED-MODE POWER SUPPLY INCORPORATING RECTIFYING CIRCUIT

CROSS REFERENCE TO RELATED APPLICATIONS

This application claims priority benefit of Japanese Patent Application No. JP 2019-124346 filed in the Japan Patent Office on Jul. 3, 2019 and JP 2020-048074 filed in the Japan Patent Office on Mar. 18, 2020. Each of the above-referenced applications is hereby incorporated herein by reference in its entirety.

BACKGROUND

The present disclosure relates to a rectifying circuit and a switched-mode power supply that incorporates a rectifying circuit therein.

FIG. 15 of the accompanying drawings illustrates an existing switched-mode power supply. In an existing switched-mode power supply 100, when a pulsed voltage output from a half-bridge drive circuit 120 is applied through a coil 150 to a primary winding L1 of a transformer 110, a pulsed induced voltage is generated across a secondary winding L2a of the transformer 110. At this time, in a rectifying circuit 130, a current rectified by a diode D11 causes electric charges to be stored in a capacitor C11.

When a pulsed voltage that is in opposite phase to the above pulsed voltage is output from the half-bridge drive circuit 120, a pulsed induced voltage that is in opposite phase to the above pulsed induced voltage is generated across a secondary winding L2b of the transformer 110. At this time, in the rectifying circuit 130, a current rectified by a diode D12 causes electric charges to be stored in the capacitor C11.

The above sequence of operation is repeated to cause the rectifying circuit 130 to perform full-wave rectification, i.e., bidirectional rectification, on the pulsed induced voltages generated respectively across the secondary windings L2a and L2b.

Examples of the above related art include JP 2019-9989A and Japanese Patent No. 5007966.

SUMMARY

The rectifying circuit 130 of the related art may require the transformer 110, i.e., a transformer with a midpoint tap, having the secondary windings L2a and L2b that are wound in different directions in order to realize its full-wave rectification.

However, while one of the secondary windings L2a and L2b is in a rectifying action, the other does not contribute to any rectifying action at all. Therefore, the transformer 110 has a low rate of utilization of its windings and terminals to be large in size and hence to produced increased heat due to a low degree of coupling.

In view of the problems referred to above, it is therefore desirable to provide a rectifying circuit that is capable of increasing the rate of utilization of the windings of a transformer and a switched-mode power supply that incorporates such a rectifying circuit.

According to a first configuration of the present disclosure, there is provided a rectifying circuit including a first rectifying section for rectifying a positive induced voltage generated across a secondary winding of a transformer, a second rectifying section for rectifying a negative induced voltage generated across the secondary winding, and an inductance section connected between the first rectifying section and the second rectifying section.

According to a second configuration of the present disclosure, in the rectifying circuit according to the first configuration, the inductance section may include an auxiliary winding coupled to a primary winding of the transformer.

According to a third configuration of the present disclosure, in the rectifying circuit according to the second configuration, a degree of coupling between the primary winding and the auxiliary winding may be smaller than a degree of coupling between the primary winding and the secondary winding.

According to a fourth configuration of the present disclosure, in the rectifying circuit according to the second or third configuration, the inductance section may include a connection coil for limiting a short-circuiting current flowing through the auxiliary winding.

According to a fifth configuration of the present disclosure, in the rectifying circuit according to the fourth configuration, the connection coil may be a balancing coil having a midpoint tap connected to an output terminal for outputting an output voltage.

According to a sixth configuration of the present disclosure, in the rectifying circuit according to the first configuration, the inductance section may include a connection coil not coupled to a primary winding of the transformer.

According to a seventh configuration of the present disclosure, in the rectifying circuit according to any one of the first through sixth configurations, the first rectifying section may include a first rectifying device having a first terminal connected to a first terminal of the secondary winding and a second terminal connected to a first terminal of the inductance section and a first capacitor having a first terminal connected to the first terminal of the inductance section and a second terminal connected to a second terminal of the secondary winding, and the second rectifying section may include a second rectifying device having a first terminal connected to the second terminal of the secondary winding and a second terminal connected to a second terminal of the inductance section and a second capacitor having a first terminal connected to the second terminal of the inductance section and a second terminal connected to the first terminal of the secondary winding.

According to an eighth configuration of the present disclosure, the rectifying circuit according to the seventh configuration may further include a third capacitor connected in series between the secondary winding and the first and second rectifying sections.

According to a ninth configuration of the present disclosure, in the rectifying circuit according to the fourth configuration, the first rectifying section may include a first rectifying device having a first terminal connected to a first terminal of the secondary winding and a first capacitor having a first terminal connected to a second terminal of the first rectifying device and a second terminal connected to a second terminal of the secondary winding, the second rectifying section may include a second rectifying device having a first terminal connected to the second terminal of the secondary winding and a second capacitor having a first terminal connected to a second terminal of the second rectifying device and a second terminal connected to the first terminal of the secondary winding, and the connection coil may include a first terminal connected to the second terminal of the first rectifying device and the first terminal of the first capacitor and a second terminal connected to a first terminal of the auxiliary winding, and the auxiliary winding has a second terminal connected to the second terminal of the second rectifying device and the first terminal of the second capacitor.

According to a tenth configuration of the present disclosure, in the rectifying circuit according to the fifth configuration, the first rectifying section may include a first rectifying device having a first terminal connected to a first terminal of the secondary winding and a first capacitor having a first terminal connected to a second terminal of the first rectifying device and a second terminal connected to a second terminal of the secondary winding, the second rectifying section may include a second rectifying device having a first terminal connected to the second terminal of the secondary winding and a second capacitor having a first terminal connected to a second terminal of the second rectifying device and a second terminal connected to the first terminal of the secondary winding, and the balancing coil may have a first terminal connected to the second terminal of the first rectifying device and the first terminal of the first capacitor and a second terminal connected to a first terminal of the auxiliary winding, the auxiliary winding may have a second terminal connected to the second terminal of the second rectifying device and the first terminal of the second capacitor, the midpoint tap of the balancing coil may be connected to a first terminal of an output smoothing capacitor and the output terminal for outputting the output voltage, and the second terminal of the secondary winding may be connected to a second terminal of the output smoothing capacitor.

According to an eleventh configuration of the present disclosure, there is also provided a rectifying circuit including a pair of rectifying devices reverse-connected in series across a secondary winding of a transformer, a balancing coil connected parallel to the pair of rectifying devices, and a rectifying coil connected to a midpoint tap of the balancing coil.

According to a twelfth configuration of the present disclosure, the rectifying circuit according to the eleventh configuration may further include a capacitor for cutting off a closed circuit including the secondary winding and the balancing coil, in terms of direct currents.

According to a thirteenth configuration of the present disclosure, there is further provided a switched-mode power supply including a transformer having a primary winding and a secondary winding, a drive circuit for switchingly driving the primary winding of the transformer, and a rectifying circuit according to any one of first to twelfth configurations, connected to the secondary winding of the transformer.

According to the present disclosure disclosed in the description below, there is provided a rectifying circuit that is capable of increasing the rate of utilization of the windings of a transformer and a switched-mode power supply that incorporates such a rectifying circuit.

DETAILED DESCRIPTION OF THE PREFERRED EMBODIMENTS

First Embodiment

Figure 1:
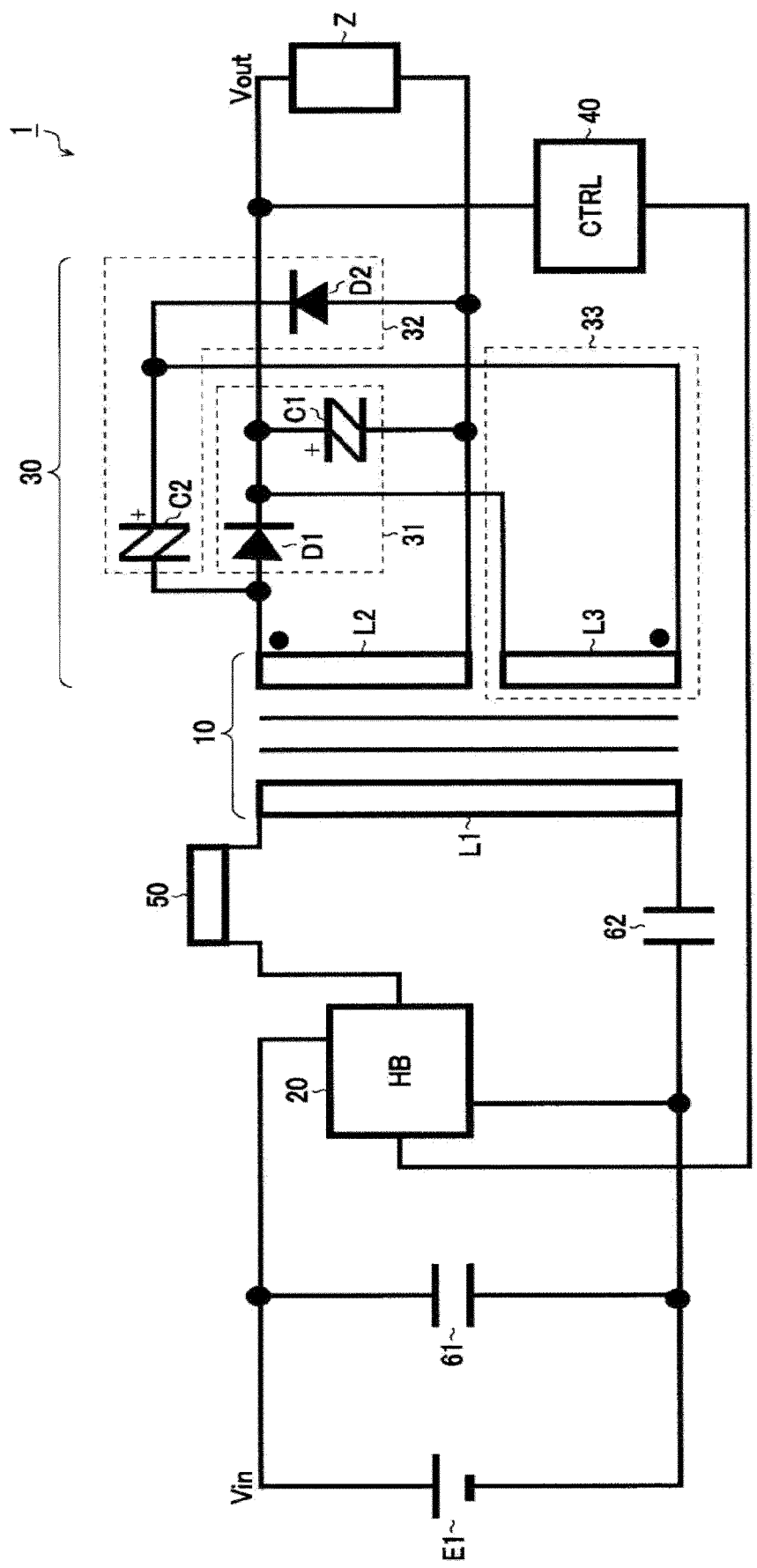
FIG. 1 is a circuit diagram, partly in block form, of a switched-mode power supply according to a first embodiment of the present disclosure.

FIG. 1 illustrates, partly in block form, a switched-mode power supply 1 according to a first embodiment of the present disclosure. As illustrated in FIG. 1, the switched-mode power supply 1 according to the first embodiment is an insulated direct current/direct current (DC/DC) converter with a primary circuit system and a secondary circuit system that are electrically insulated from each other, for converting an input voltage Vin supplied from a direct current (DC) power supply E1 into an output voltage Vout and supplying the output voltage Vout to a load Z. The switched-mode power supply 1 has a transformer 10, a half-bridge drive circuit 20, a rectifying circuit 30, a control circuit 40, a coil 50, and capacitors 61 and 62.

The transformer 10 includes a primary winding L1 provided in the primary circuit system and a secondary winding L2 provided in the secondary circuit system and magnetically coupled to the primary winding L1.

The half-bridge drive circuit 20 includes an upper switch and a lower switch, both not illustrated, connected in series between a positive terminal of the DC power supply E1, i.e., a terminal to which the input voltage Vin is applied, and a negative terminal of the DC power supply E1, i.e., the ground of the primary circuit system. The half-bridge drive circuit 20 switchingly drives the primary winding L1 of the transformer 10 according to a command from a control circuit 40.

The rectifying circuit 30 includes a first rectifying section 31, a second rectifying section 32, and an inductance section 33, and generates the output voltage Vout by performing full-wave rectification on an induced voltage generated across the secondary winding L2 of the transformer 10.

The first rectifying section 31 includes a diode D1 and a capacitor C1, and rectifies the positive induced voltage generated across the secondary winding L2 of the transformer 10. The diode D1 has an anode connected to a first terminal of the secondary winding L2, i.e., a winding starting terminal thereof. A cathode of the diode D1 and a first terminal of the capacitor C1 are connected to an output terminal for outputting the output voltage Vout, i.e., a higher-potential terminal of the load Z, and a first terminal of the inductance section 33, i.e., a winding terminating terminal of an auxiliary winding L3. The capacitor C1 has a second terminal connected to a second terminal of the secondary winding L2, i.e., a winding terminating terminal thereof, and a lower-potential terminal of the load Z.

The second rectifying section 32 includes a diode D2 and a capacitor C2, and rectifies the negative induced voltage generated across the secondary winding L2 of the transformer 10. The diode D2 has an anode connected to a second terminal of the secondary winding L2, i.e., a winding terminating terminal thereof, and the lower-potential terminal of the load Z. A cathode of the diode D2 and a first terminal of the capacitor C2 are connected to a second terminal of the inductance section 33, i.e., a winding starting terminal of the auxiliary winding L3. The capacitor C2 has a second terminal connected to the first terminal of the secondary winding L2, i.e., the winding starting terminal thereof.

Each of the diodes D1 and D2 may be replaced with a synchronous rectifying circuit, e.g., a switching device such as a metal oxide semiconductor field effect transistor (MOSFET), that is turned on and off in synchronism with the half-bridge drive circuit 20 by the control circuit 40, or a switching device that is turned on and off by detecting a voltage applied thereacross or a current flowing therethrough.

The inductance section 33 includes the auxiliary winding L3. The auxiliary winding L3 is connected between the first rectifying section 31, i.e., a connection node between the diode D1 and the capacitor C1, and the second rectifying section 32, i.e., a connection node between the diode D2 and the capacitor C2. The auxiliary winding L3 is magnetically coupled to the primary winding L1 of the transformer 10. The auxiliary winding L3 is wound such that its own induced voltage is equal to the induced voltage across the secondary winding L2. However, a degree of coupling between the primary winding L1 and the auxiliary winding L3 is smaller than a degree of coupling between the primary winding L1 and the secondary winding L2.

The control circuit 40 has a function, i.e., an output feedback control function, to control the half-bridge drive circuit 20 for bringing the output voltage Vout into agreement with a desired target value, for example. The control circuit 40 with such a function is able to stably supply a constant output voltage Vout to the load Z.

The coil 50 is connected between an output terminal of the half-bridge drive circuit 20, i.e., a connection node between the upper and lower switches thereof, and a first terminal of the primary winding L1, and functions as a resonant coil.

The capacitor 61 is connected parallel to the DC power supply E1 and functions as an input filter capacitor for removing a noise component of the input voltage Vin.

The capacitor 62 is connected between a second terminal of the primary winding L1 and the negative terminal of the DC power supply E1, i.e., the ground of the primary circuit system, and functions as a resonant capacitor.

Although not illustrated in FIG. 1, the switched-mode power supply 1 may have a starter circuit that pre-charges the capacitors C1 and C2 upon startup.

Operation of the switched-mode power supply 1 will be described below. When the DC power supply E1 is turned on, the input voltage Vin is applied to the capacitor 61 and the half-bridge drive circuit 20. The half-bridge drive circuit 20 applies a pulsed voltage through the coil 50 to the primary winding L1 of the transformer 10, causing the secondary winding L2 to generate a pulsed induced voltage thereacross.

Providing a positive induced voltage is generated across the secondary winding L2, for example, electric charges are stored in the capacitor C1 via the diode D1. On the other hand, providing a negative induced voltage is generated across the secondary winding L2, electric charges are stored in the capacitor C2 via the diode D2.

The above sequence of operation is repeated to cause the rectifying circuit 30 to perform full-wave rectification, i.e., bidirectional rectification, on the pulsed induced voltages generated respectively across the secondary winding L2.

The auxiliary winding L3 also generates thereacross a pulsed induced voltage that is identical or essentially identical to the pulsed induced voltage across the secondary winding L2. Therefore, the capacitors C1 and C2 connected to each other through the auxiliary winding L3 are charged to the same potential. In other words, when a pulsed induced voltage occurs at the first terminal of one of the capacitors C1 and C2, an induced voltage having the same waveform occurs also at the first terminal of the other of the capacitors C1 and C2. Consequently, basically no short-circuiting pulsed current flows through the auxiliary winding L3.

The auxiliary winding L3 has a smaller degree of coupling with the primary winding L1 than the primary winding L1 has with the secondary winding L2, and a current smaller than a secondary current flowing through the secondary winding L2, e.g., a current equal to or smaller than ½ of the root-mean-square (RMS) value, flows through the auxiliary winding L3. Therefore, the auxiliary winding L3 may have a smaller cross-sectional area, i.e., a smaller wire diameter, than the secondary winding L2. As a result, the transformer 10 may not be unduly large in size.

The rectifying circuit 30 configured as described above is able to perform full-wave rectification on the positive and negative induced voltages regardless of the direction of the current flowing through the secondary winding L2 without the need for a transformer with a midpoint tap. Unlike a transformer with a midpoint tap that may require two secondary windings of the same wire thickness, the transformer 10 that is connected to the rectifying circuit 30 has the single secondary winding L2 and has an increased rate of utilization of windings. Accordingly, as the cross-sectional area of the secondary winding L2 can be increased, i.e., the wire diameter thereof can be increased, without making the transformer 10 large in size and hence lowering the degree of coupling between the windings, it is possible to restrain the heat generated by the transformer 10, represented by $\sqrt{2}RI^2$ where R represents a resistance value of the secondary winding L2 and I a current value of the secondary current.

Furthermore, since a surge component can be released through the auxiliary winding L3, it is possible to design the diodes D1 and D2 for respective minimum withstand voltages may be required.

Second Embodiment

Figure 2:
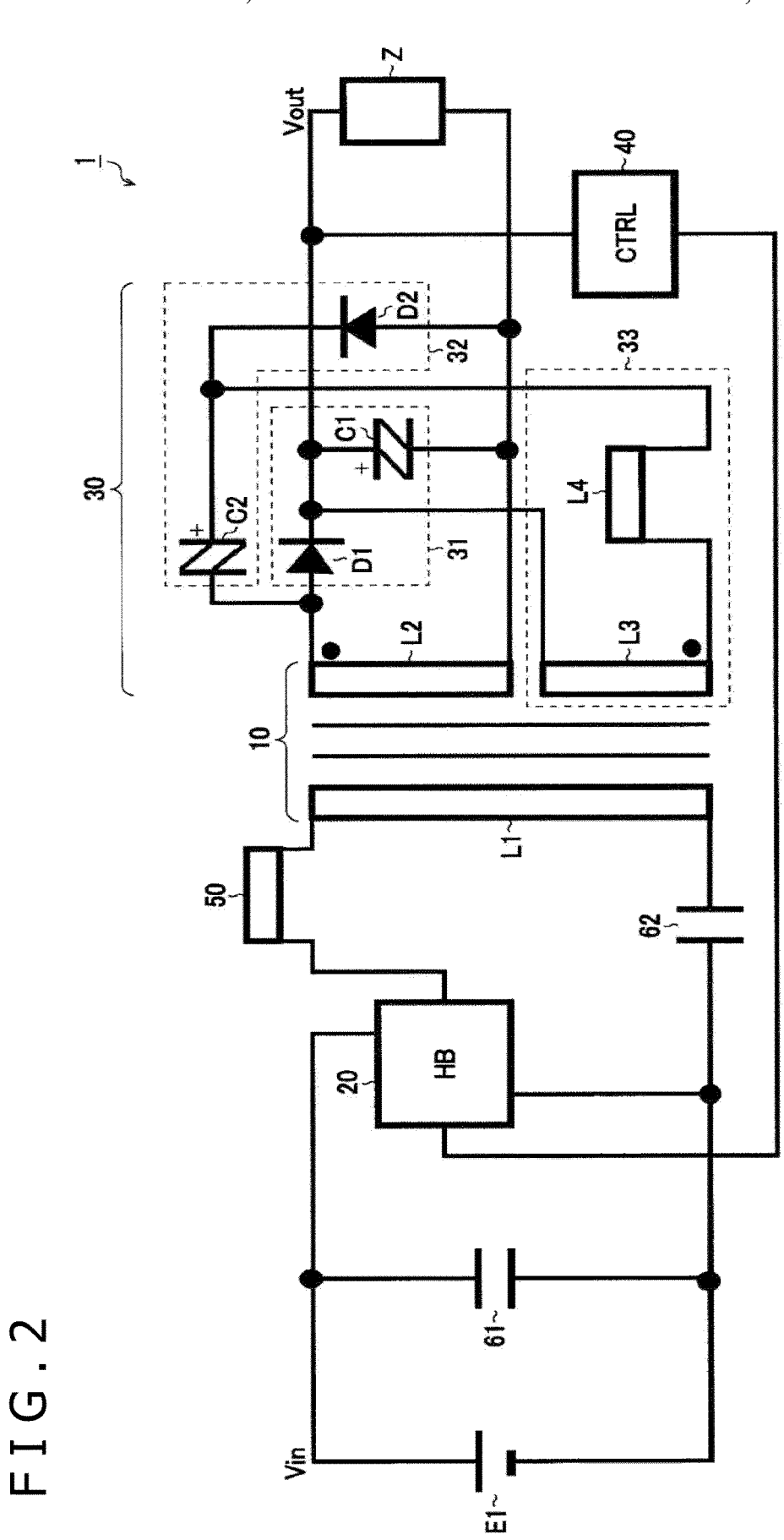
FIG. 2 is a circuit diagram, partly in block form, of a switched-mode power supply according to a second embodiment of the present disclosure.

FIG. 2 illustrates, partly in block form, a switched-mode power supply 1 according to a second embodiment of the present disclosure. As illustrated in FIG. 2, the switched-mode power supply 1 according to the second embodiment is based on the first embodiment (FIG. 1) with the inductance section 33 changed in configuration.

More specifically, the inductance section 33 further includes a connection coil L4 for limiting a short-circuiting pulsed current flowing through the auxiliary winding L3.

In FIG. 2, the connection coil L4 is connected between the second rectifying section 32, i.e., the connection node between the diode D2 and the capacitor C2, and the second terminal of the auxiliary winding L3. However, the connection coil L4 is not limited to such a connected position, but may be connected between the first rectifying section 31, i.e., the connection node between the diode D1 and the capacitor C1, and the first terminal of the auxiliary winding L3.

According to the present embodiment, even if the induced voltages generated respectively across the secondary winding L2 and the auxiliary winding L3 are different from each other, it is possible to limit a short-circuiting pulsed current due to the voltage difference, thereby restraining heating of the transformer 10.

Third Embodiment

Figure 3:
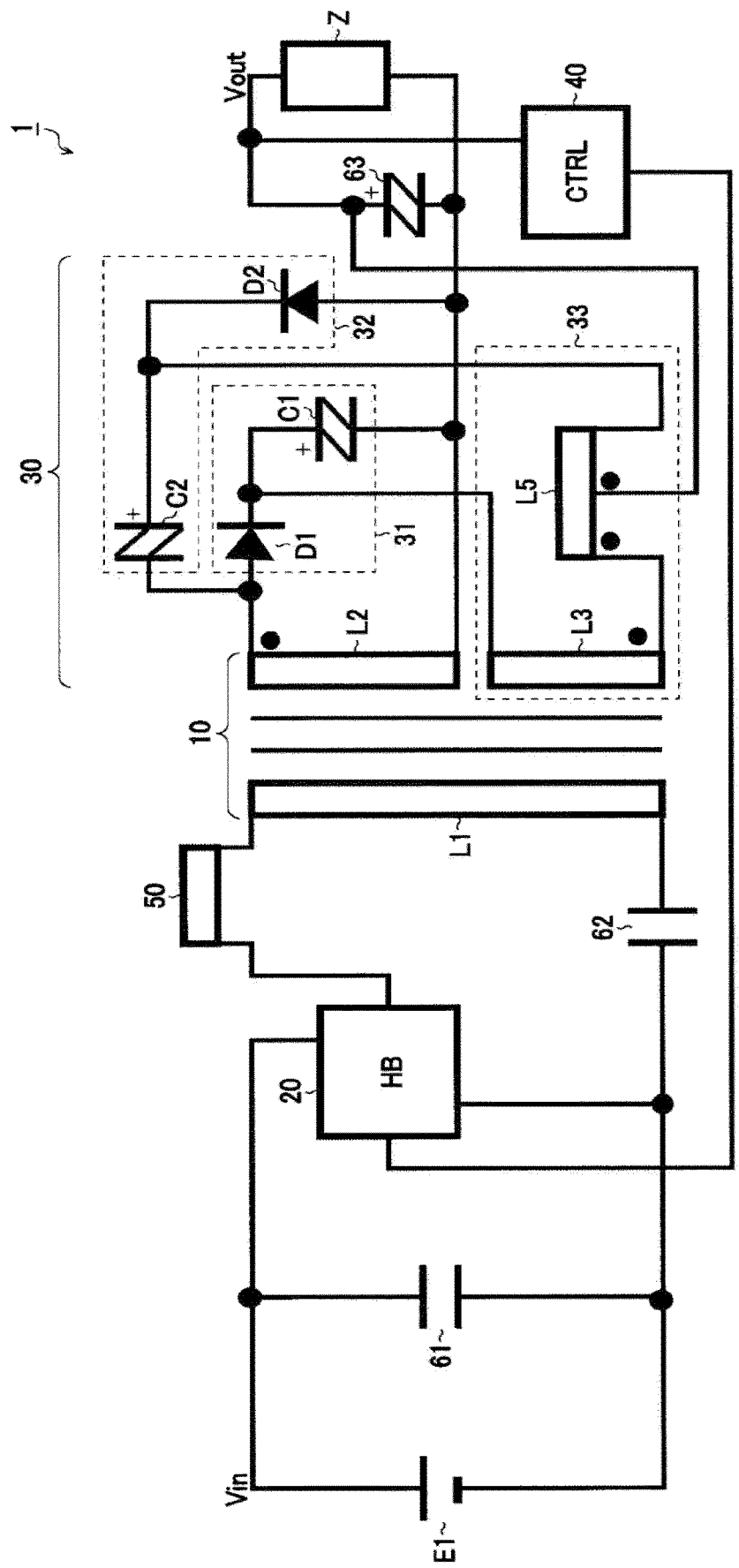
FIG. 3 is a circuit diagram, partly in block form, of a switched-mode power supply according to a third embodiment of the present disclosure.

FIG. 3 illustrates, partly in block form, a switched-mode power supply 1 according to a third embodiment of the present disclosure. As illustrated in FIG. 3, the switched-mode power supply 1 according to the third embodiment is based on the second embodiment (FIG. 2) with the inductance section 33 changed in configuration.

More specifically, the inductance section 33 includes, as the connection coil L4 referred to above, a balancing coil L5 having a midpoint tap connected to the output terminal for outputting the output voltage Vout. The connection node between the diode D1 and the capacitor C1 is severed from the output terminal for outputting the output voltage Vout. Furthermore, a capacitor 63 is connected parallel to the load Z.

According to the present embodiment, the stability of the output feedback control is increased.

Fourth Embodiment

Figure 4:
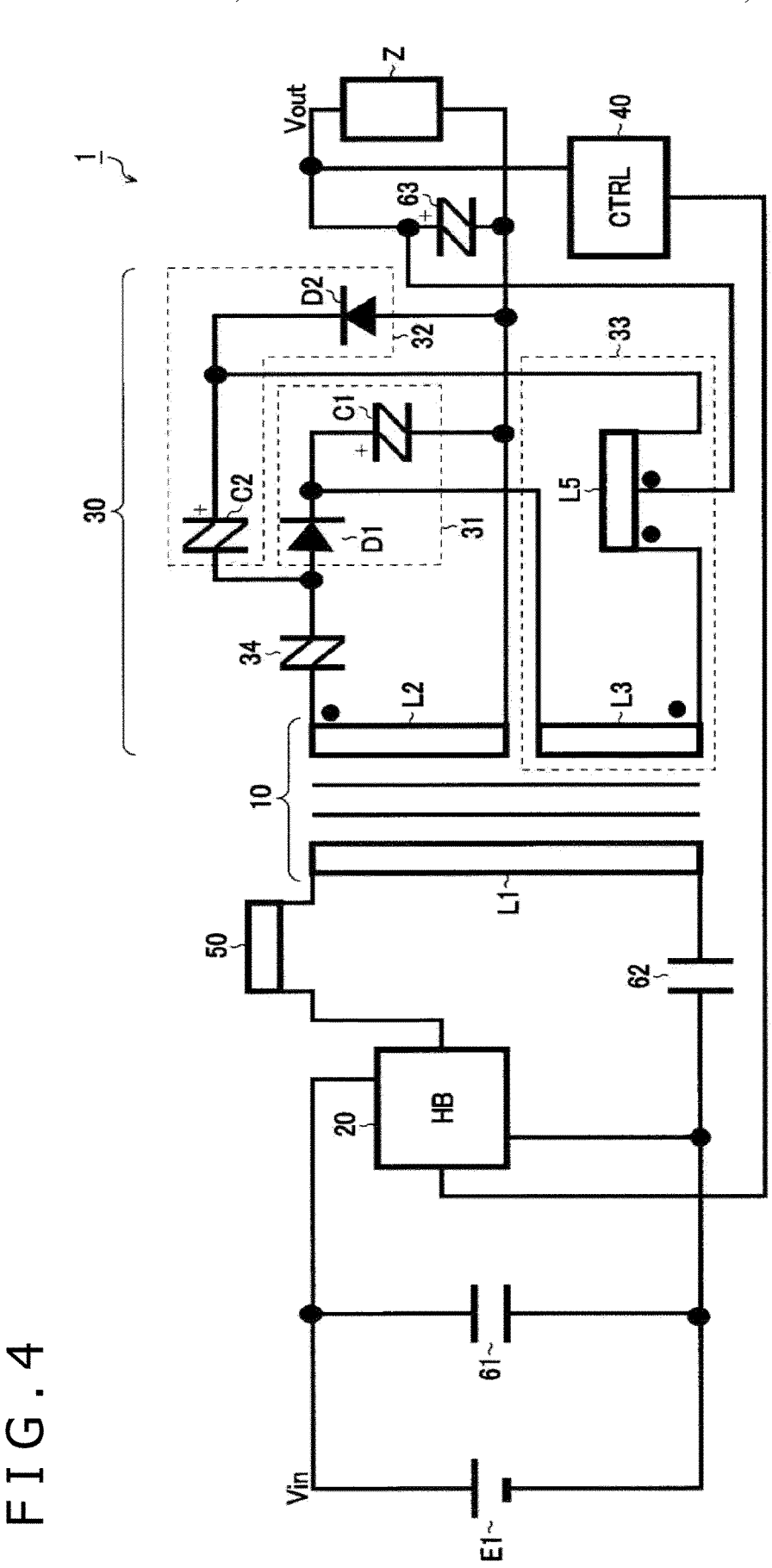
FIG. 4 is a circuit diagram, partly in block form, of a switched-mode power supply according to a fourth embodiment of the present disclosure.

FIG. 4 illustrates, partly in block form, a switched-mode power supply 1 according to a fourth embodiment of the present disclosure. As illustrated in FIG. 4, the switched-mode power supply 1 according to the fourth embodiment is based on the third embodiment (FIG. 3) with the rectifying circuit 30 changed in configuration.

More specifically, the rectifying circuit 30 further has a capacitor 34 connected between the first terminal of the secondary winding L2, i.e., the winding starting terminal thereof, and the first rectifying section 31 and the second rectifying section 32, i.e., a connection node between the diode D1 and the capacitor C2.

According to the present embodiment, even if the positive and negative induced voltages generated across the secondary winding L2 vary from each other, the variation can be canceled, making it possible to equalize secondary currents flowing respectively through the first rectifying section 31 and the second rectifying section 32.

In FIG. 4, the switched-mode power supply 1 according to the fourth embodiment is based on the third embodiment (FIG. 3). However, the switched-mode power supply 1 according to the fourth embodiment may be based on the first embodiment (FIG. 1) or the second embodiment (FIG. 2).

Fifth Embodiment

Figure 5:
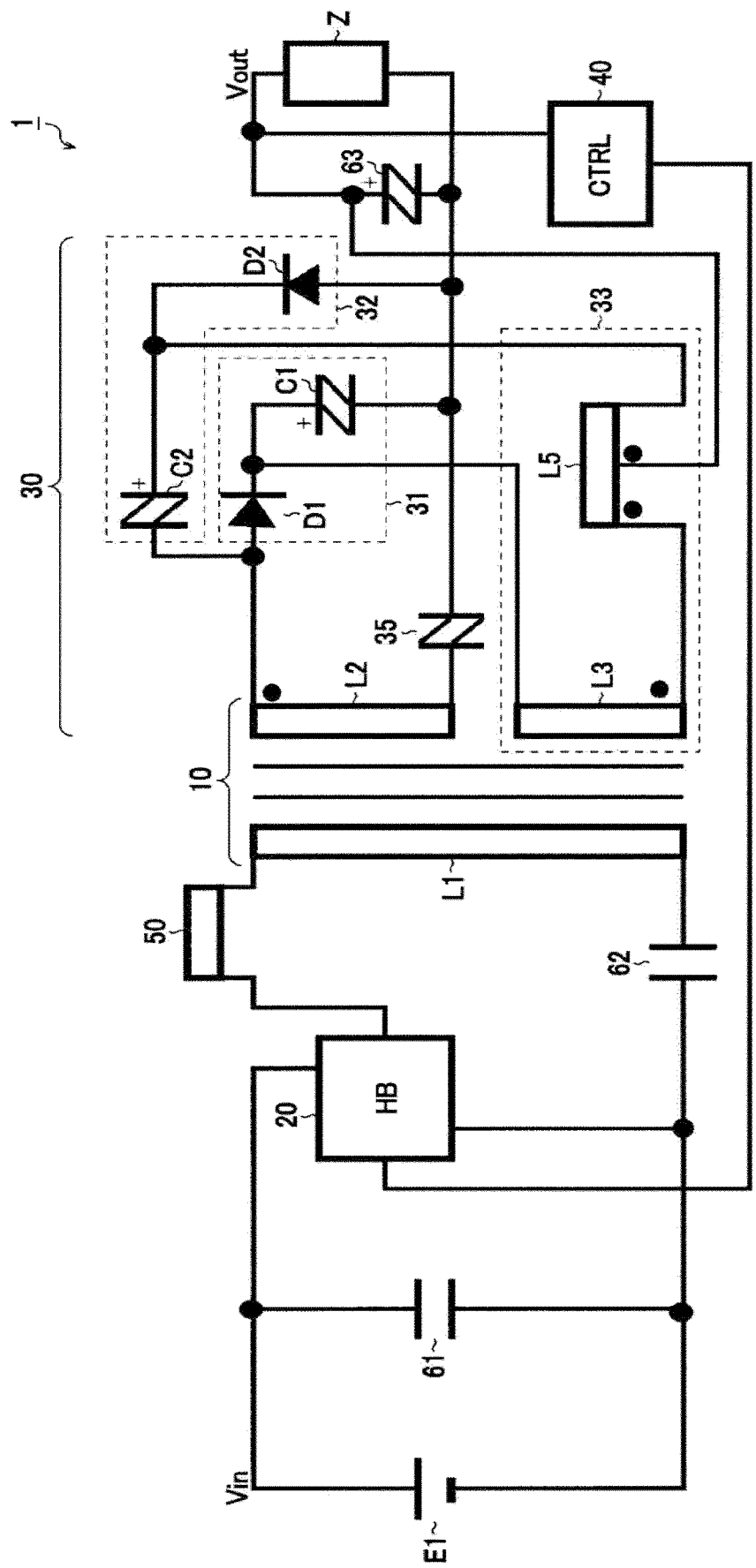
FIG. 5 is a circuit diagram, partly in block form, of a switched-mode power supply according to a fifth embodiment of the present disclosure.

FIG. 5 illustrates, partly in block form, a switched-mode power supply 1 according to a fifth embodiment of the present disclosure. As illustrated in FIG. 5, the switched-mode power supply 1 according to the fifth embodiment is based on the third embodiment (FIG. 3) with the rectifying circuit 30 changed in configuration.

More specifically, the rectifying circuit 30 further has a capacitor 35 connected between the second terminal of the secondary winding L2, i.e., the winding terminating terminal thereof, and the first rectifying section 31 and the second rectifying section 32, i.e., a connection node between the diode D2 and the capacitor C1.

According to the present embodiment, as is the case with the fourth embodiment (FIG. 4) referred to above, even if the positive and negative induced voltages generated across the secondary winding L2 vary from each other, the variation can be canceled, making it possible to equalize secondary currents flowing respectively through the first rectifying section 31 and the second rectifying section 32.

In FIG. 5, the switched-mode power supply 1 according to the fifth embodiment is based on the third embodiment (FIG. 3). However, the switched-mode power supply 1 according to the fifth embodiment may be based on the first embodiment (FIG. 1) or the second embodiment (FIG. 2).

Sixth Embodiment

Figure 6:
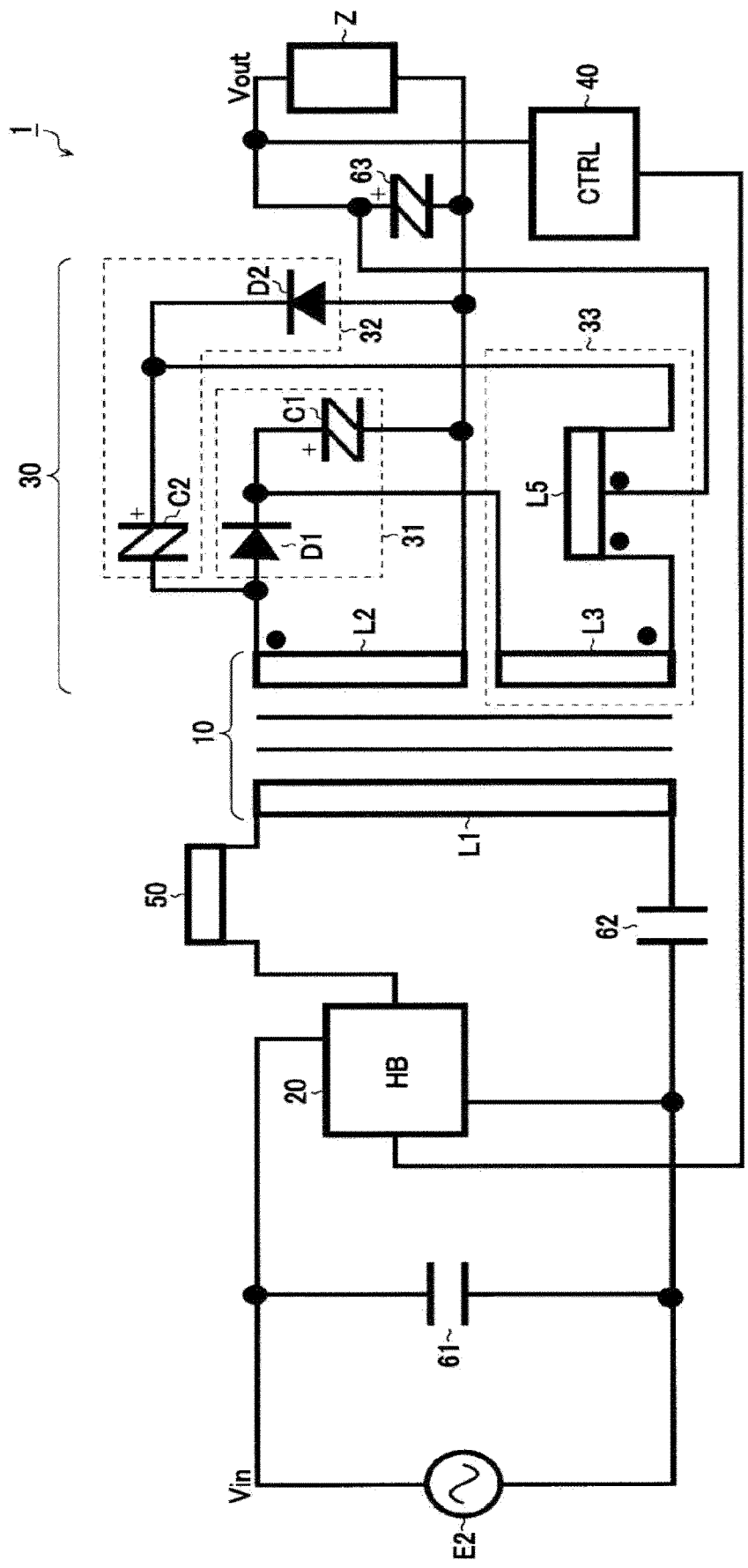
FIG. 6 is a circuit diagram, partly in block form, of a switched-mode power supply according to a sixth embodiment of the present disclosure.

FIG. 6 illustrates, partly in block form, a switched-mode power supply 1 according to a sixth embodiment of the present disclosure. As illustrated in FIG. 6, the switched-mode power supply 1 according to the sixth embodiment is based on the third embodiment (FIG. 3) with an alternating current (AC) power supply E2 connected in place of the DC power supply E1.

Specifically, the switched-mode power supply 1 according to the sixth embodiment is an insulated alternating current/direct current (AC/DC) converter with a primary circuit system and a secondary circuit system that are electrically insulated from each other, for converting an input voltage Vin supplied from the AC power supply E2 into an output voltage Vout and supplying the output voltage Vout to a load Z.

In order to allow the switched-mode power supply 1 to operate with the AC power supply E2, the half-bridge drive circuit should be made compatible with input voltages Vin in the positive and negative bidirectional directions.

In FIG. 6, the switched-mode power supply 1 according to the sixth embodiment is based on the third embodiment (FIG. 3). However, the switched-mode power supply 1 according to the sixth embodiment may be based on either one of the first embodiment (FIG. 1), the second embodiment (FIG. 2), the fourth embodiment (FIG. 4), and the fifth embodiment (FIG. 5).

Seventh Embodiment

Figure 7:
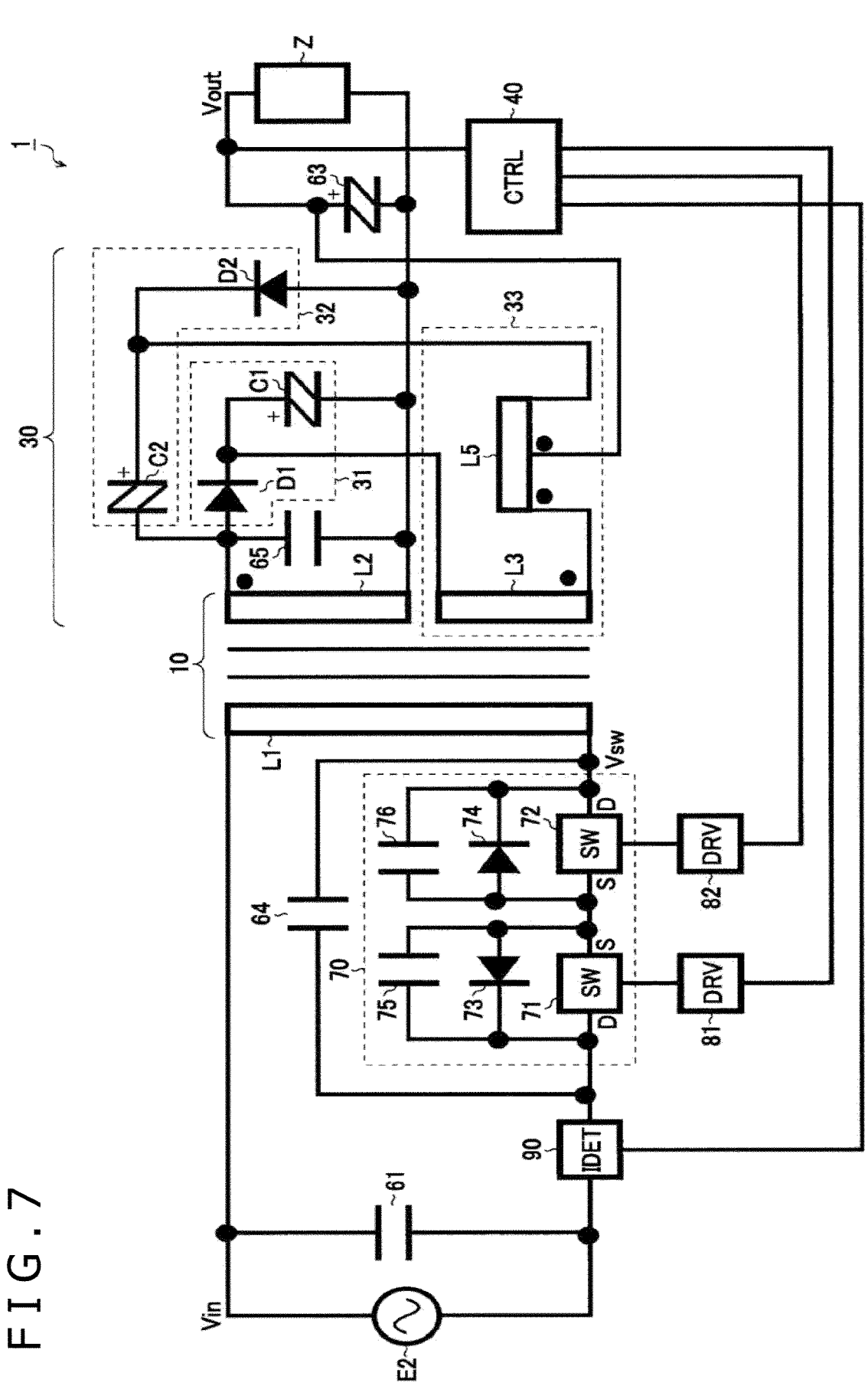
FIG. 7 is a circuit diagram, partly in block form, of a switched-mode power supply according to a seventh embodiment of the present disclosure.

FIG. 7 illustrates, partly in block form, a switched-mode power supply 1 according to a seventh embodiment of the present disclosure. The switched-mode power supply 1 according to the seventh embodiment is based on the sixth embodiment (FIG. 6) with changes made mainly in the primary circuit system.

More specifically, the switched-mode power supply 1 has a capacitor 64, a bidirectional switch 70, a pair of drivers 81 and 82, and a current detecting device 90 in place of the half-bridge drive circuit 20, the coil 50, and the capacitor 62 referred to above, as components of a primary circuit system. The switched-mode power supply 1 further has a capacitor 65 added to a secondary circuit system thereof.

Of the above components, the bidirectional switch 70 and the drivers 81 and 82 correspond to a drive circuit for switchingly driving the primary winding L1 of the transformer 10.

The capacitor 64 is connected parallel to the bidirectional switch 70 and functions as a resonant capacitor.

The bidirectional switch 70 includes a pair of switching devices 71 and 72 reverse-connected in series between the AC power supply E2 and the primary winding L1.

For example, in a case where the switching devices 71 and 72 are Si-base or SiC-base N-channel type metal oxide semiconductor field effect transistors (NMOSFETs), the switching devices 71 and 72 have respective sources S connected in common, the switching device 71 has a drain D connected to the AC power supply E2, and the switching device 72 has a drain D connected to the primary winding L1. The switching devices 71 and 72 may alternatively be GaN devices or insulated gate bipolar transistors (IGBTs).

The switching devices 71 and 72 are associated with respective internal diodes 73 and 74 and respective internal capacitances 75 and 76. In FIG. 7, a cathode of the internal diode and a first terminal of the internal capacitance 75 are connected to the drain D of the switching device 71. An anode of the internal diode 73 and a second terminal of the internal capacitance 75 are connected to a source S of the switching device 71. On the other hand, a cathode of the internal diode 74 and a first terminal of the internal capacitance 76 are connected to the drain D of the switching device 72. An anode of the internal diode and a second terminal of the internal capacitance 76 are connected to a source S of the switching device 72.

The drivers 81 and 82 generate drive signals, i.e., gate signals, respectively for the switching devices 71 and 72 in response to commands from the control circuit 40.

For example, the control circuit 40 has a function, i.e., an output feedback control function, to turn on and off the bidirectional switch 70 for bringing the DC output voltage Vout into agreement with a desired target value, for example. The control circuit 40 with such a function is able to stably supply a constant output voltage Vout to the load Z. An existing pulse width modulation process, an existing critical process, or the like may be applied as the output feedback control process.

Furthermore, the control circuit 40 has a function, i.e., a power factor improving function, to turn on and off the bidirectional switch 70 for making the power factor of the switched-mode power supply 1 closer to 1. The control circuit 40 with such a function is able to realize a one-converter-type switched-mode power supply 1 as it may require no separate power factor improving circuit.

In addition, the control circuit 40 has a function, i.e., a constant current control function, to monitor a current sense signal, i.e., a signal depending on a primary current, acquired using the current detecting device 90, e.g., a sense resistor, and to turn on and off the bidirectional switch 70 for preventing the primary current from exceeding a predetermined upper limit value. The control circuit 40 with such a function is able to increase the stability of the switched-mode power supply 1 as no excessive primary current flows in the primary circuit system.

A current feedback control process using the current detecting device 90 makes it possible to control a harmonic current as well as to improve the power factor and perform overcurrent protection.

Moreover, the control circuit 40 has a function, i.e., a zero-volt switching (ZVS) function, to monitor a voltage across the bidirectional switch 70 and hence a voltage across the capacitor 64 and to turn on the bidirectional switch 70 at the time when the monitored voltage value becomes 0 V. The control circuit 40 with such a function is able to increase the conversion efficiency of the switched-mode power supply 1 as the switching loss of the bidirectional switch 70 is reduced.

Alternatively, the control circuit 40 may have a function, i.e., an individual ZVS function, to individually switch the switching devices 71 and 72 at zero voltage. The control circuit 40 with such a function is able to restrain heating of the bidirectional switch 70 and further increase the conversion efficiency of the switched-mode power supply 1 because the switching loss of the bidirectional switch 70 is further reduced.

Basic operation of the switched-mode power supply 1 configured as described above will be described below. When the control circuit 40 turns on the bidirectional switch 70, i.e., both the switching devices 71 and 72, a primary current flows through the primary winding L1 of the transformer 10, storing energy in the transformer 10. When a predetermined amount of energy is stored in the transformer 10, the bidirectional switch 70 is turned off.

For example, in a case where a switching voltage Vsw appearing on a connection node between the primary winding L1 and the bidirectional switch 70 is of a positive potential, the control circuit 40 controls the driver 82 to turn off the switching device 72. At this time, the energy stored in the transformer 10 is applied to charge the internal capacitance 76 associated with the switching device 72, the respective internal capacitances, not illustrated, of the diodes D1 and D2, and the capacitors 64 and 65. At this time, furthermore, the energy output from the secondary winding L2 is rectified by the diode D1, stored in the capacitor C1, and then output to the capacitor 63 through the midpoint tap of the balancing coil L5.

On the other hand, in a case where the switching voltage Vsw is of a negative potential, the control circuit 40 controls the driver 81 to turn off the switching device 71. At this time, the energy stored in the transformer 10 is applied to charge the internal capacitance 75 associated with the switching device 71, the respective internal capacitances, not illustrated, of the diodes D1 and D2, and the capacitors 64 and 65. At this time, furthermore, the energy output from the secondary winding L2 is rectified by the diode D2, stored in the capacitor C2, and then output to the capacitor 63 through the midpoint tap of the balancing coil L5.

The capacitors C1 and C2 are connected to each other through the inductance section 33, i.e., the auxiliary winding L3 and the balancing coil L5. Since the secondary winding L2 and the auxiliary winding L3 are designed such that the induced voltages respectively across the secondary winding L2 and the auxiliary winding L3 are equal to each other, as described above, no short-circuiting current flows through the inductance section 33.

Thereafter, when the energy of the transformer 10 is fully discharged into the capacitor 63, the bidirectional switch 70 is turned on again at an appropriate timing, repeating the above sequence of operation.

Thus, the rectifying circuit 30 described above is also applicable to the switched-mode power supply 1 which drives the primary winding L1 using the bidirectional switch 70.

Eighth Embodiment

Figure 8:
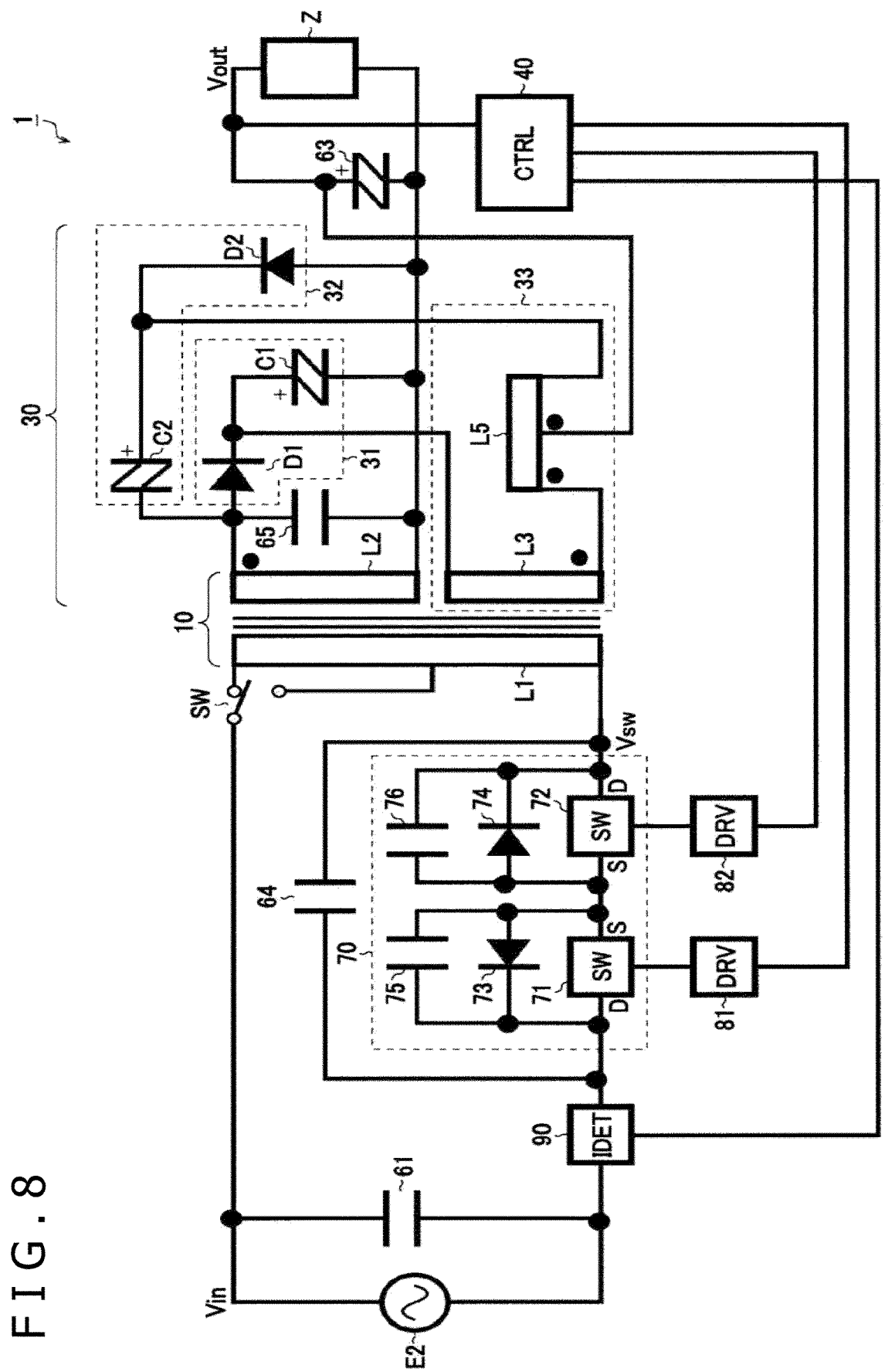
FIG. 8 is a circuit diagram, partly in block form, of a switched-mode power supply according to an eighth embodiment of the present disclosure.

FIG. 8 illustrates, partly in block form, a switched-mode power supply 1 according to an eighth embodiment of the present disclosure. As illustrated in FIG. 8, the switched-mode power supply 1 according to the eighth embodiment is based on the seventh embodiment (FIG. 7) with a selector switch SW added for changing the number of turns of the primary winding L1.

The selector switch SW has a common node connected to the terminal to which the input voltage Vin is applied, a first selection node connected to the first terminal of the primary winding L1, and a second selection node connected to a midpoint tap of the primary winding L1. Therefore, the selector switch SW is able to select either the first terminal of the primary winding L1 or the midpoint tap thereof to which the input voltage Vin is to be applied.

For example, in an application where a relatively high input voltage Vin, e.g., Vin=AC 220 V, is input, the common node and first selection node of the selector switch SW are connected together to conduct the input voltage Vin. At this time, the turn ratio of the primary winding L1 to the secondary winding L2 is represented by n1:n2 where n1 represents the number of turns of the primary winding L1 from the first terminal to the second terminal thereof and n2 the number of turns of the secondary winding L2 from the first terminal to the second terminal thereof.

On the other hand, in an application where a relatively low input voltage Vin, e.g., Vin=AC 100 V, is input, the common node and second selection node of the selector switch SW are connected together to conduct the input voltage Vin. At this time, the turn ratio of the primary winding L1 to the secondary winding L2 is represented by n1':n2 where n1' represents the number of turns of the primary winding L1 from the first terminal to the midpoint tap thereof, n1>n1'.

By thus changing the number of turns of the primary winding L1 depending on the input voltage Vin, the on-time or switching frequency of the bidirectional switch 70 is less likely to change even when the input voltage Vin is varied.

Consequently, in making the switched-mode power supply 1 compatible with various input voltages Vin, i.e., in making the switched-mode power supply 1 compatible with multiple inputs, the control circuit 40, i.e., a controller IC, can be shared and the transformer 10 and its peripheral parts can be reduced in size. Accordingly, it is possible to make the switched-mode power supply easy to use and inexpensive to purchase with universal specifications.

With the switched-mode power supply 1 according to the present embodiment, the higher the input voltage Vin is, the larger the number of turns of the primary winding L1 is for a higher inductance L. Therefore, the higher the input voltage Vin is, the higher a Q value, i.e., quality factor, represented by $\sqrt{(L/C)}$, of the resonant waveform of the voltage across the bidirectional switch 70 becomes, facilitating ZVS operation.

The selector switch SW may be a manual switch or an electrically operated switch such as a relay. In a case where the former switch is used, it is desirable to use a transformer 10 that incorporates the selector switch SW therein, i.e., a transformer with a tap selector. On the other hand, in a case where the latter switch is used, it is desirable to automatically operate the selector switch SW by detecting the input voltage Vin.

Ninth Embodiment

Figure 9:
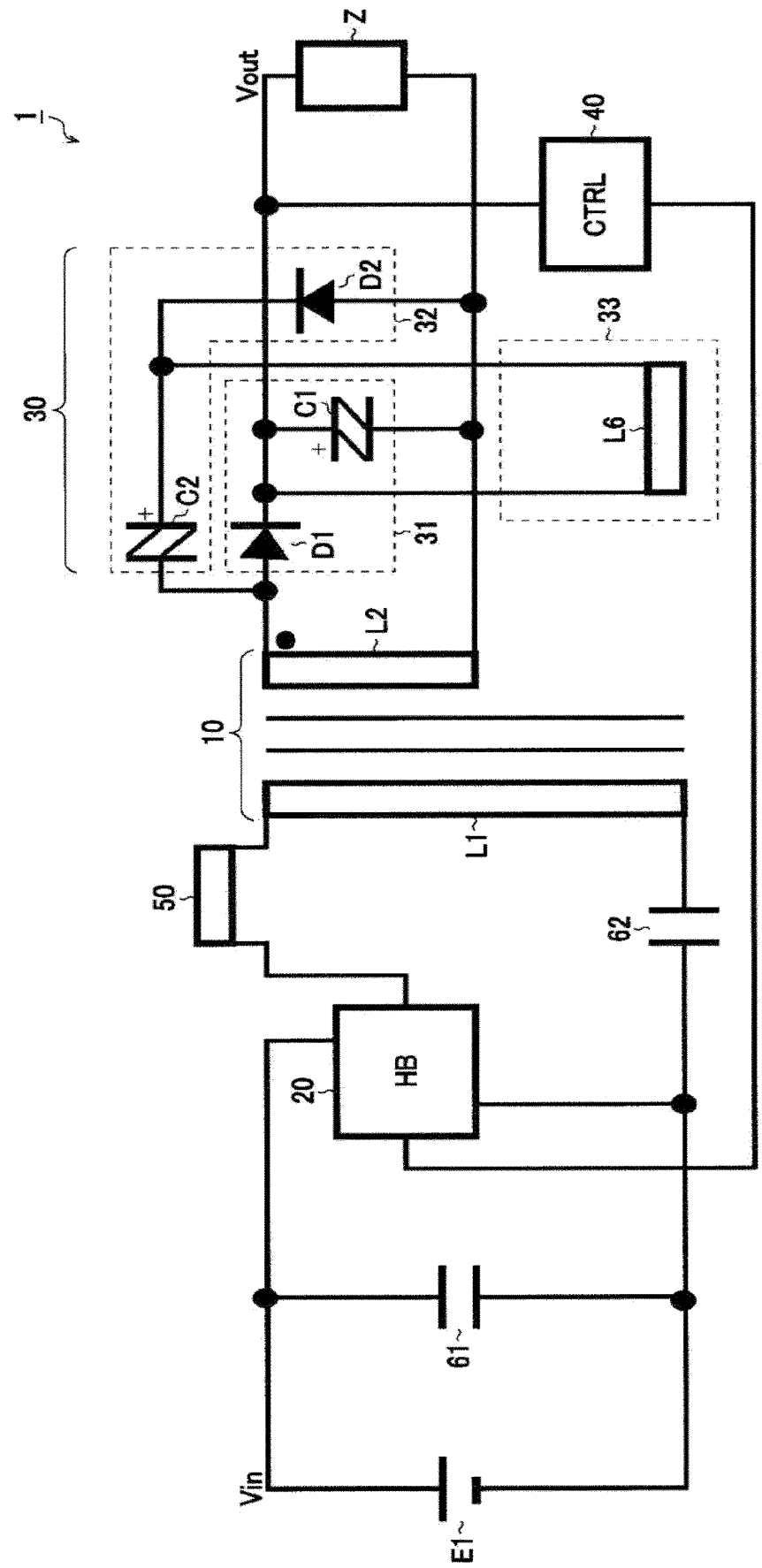
FIG. 9 is a circuit diagram, partly in block form, of a switched-mode power supply according to a ninth embodiment of the present disclosure.

FIG. 9 illustrates, partly in block form, a switched-mode power supply 1 according to a ninth embodiment of the present disclosure. As illustrated in FIG. 9, the switched-mode power supply 1 according to the ninth embodiment is based on the first embodiment (FIG. 1) with the inductance section 33 changed in configuration.

More specifically, the inductance section 33 includes a connection coil L6, not magnetically coupled to the primary winding L1, in place of the auxiliary winding L3. The connection coil L6 has a first terminal connected to the first rectifying section 31, i.e., a connection node between the diode D1 and the capacitor C1. The connection coil L6 has a second terminal connected to the second rectifying section 32, i.e., a connection node between the diode D2 and the capacitor C2.

The capacitors C1 and C2 that are connected to each other by the connection coil L6 are charged to the same potential. Consequently, basically no short-circuiting pulsed current flows through the connection coil L6. The magnetic coupling between the inductance section 33 and the primary winding L1 may, therefore, not be essential.

Tenth Embodiment

Figure 10:
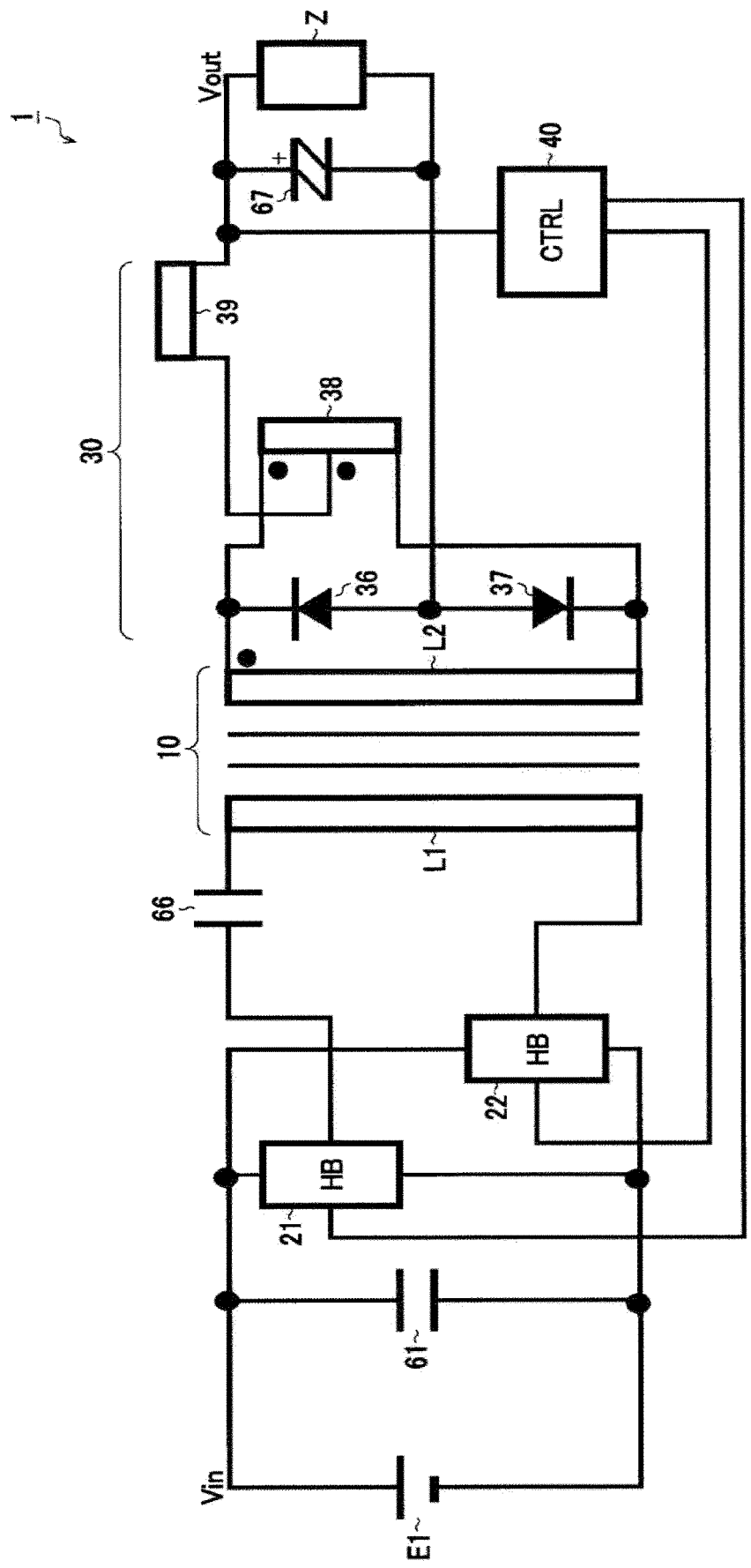
FIG. 10 is a circuit diagram, partly in block form, of a switched-mode power supply according to a tenth embodiment of the present disclosure.

FIG. 10 illustrates, partly in block form, a switched-mode power supply 1 according to a tenth embodiment of the present disclosure. As illustrated in FIG. 10, the switched-mode power supply 1 according to the tenth embodiment is an insulated DC/DC converter with a primary circuit system and a secondary circuit system that are electrically insulated from each other, for converting an input voltage Vin supplied from a DC power supply E1 into an output voltage Vout and supplying the output voltage Vout to a load Z. The switched-mode power supply 1 has a transformer 10, half-bridge drive circuits 21 and 22, a rectifying circuit 30, a control circuit 40, and capacitors 61, 66, and 67.

The transformer 10 includes a primary winding L1 provided in the primary circuit system and a secondary winding L2 provided in the secondary circuit system and magnetically coupled to the primary winding L1. The primary winding L1 has a first terminal connected through the capacitor 66 to the output terminal of the half-bridge drive circuit 21. The primary winding L1 has a second terminal connected to the output terminal of the half-bridge drive circuit 22.

Each of the half-bridge drive circuits 21 and 22 includes an upper switch and a lower switch, both not illustrated, connected in series between a positive terminal of the DC power supply E1, i.e., a terminal to which the input voltage Vin is applied, and a negative terminal of the DC power supply E1, i.e., the ground of the primary circuit system. Each of the half-bridge drive circuits 21 and 22 switchingly drives the primary winding L1 of the transformer 10 according to a command from a control circuit 40. The half-bridge drive circuits 21 and 22 may be combined together, so that they can be understood as a single full-bridge drive circuit.

The rectifying circuit 30 includes diodes 36 and 37, a balancing coil 38, and a rectifying coil 39, and generates an output voltage Vout by performing full-wave rectification on an induced voltage generated across the secondary winding L2 of the transformer 10.

The diode 36 has a cathode connected to a first terminal of the secondary winding L2, i.e., a winding starting terminal thereof. The diode 37 has a cathode connected to a second terminal of the secondary winding L2, i.e., a winding terminating terminal thereof. The diodes 36 and 37 have respective anodes connected to the ground of the secondary circuit system, i.e., a lower-potential terminal of the load Z. The diodes 36 and 37 thus connected correspond to a pair of rectifying devices reverse-connected in series between the terminals of the secondary winding L2.

The balancing coil 38 is connected parallel to the pair of rectifying devices referred to above. Specifically, the balancing coil 38 has a first terminal, i.e., a winding starting terminal, connected to the cathode of the diode 36 and a second terminal, i.e., a winding terminating terminal, connected to the cathode of the diode 37.

The rectifying coil 39 has a first terminal connected to a midpoint tap of the balancing coil 38. The rectifying coil has a second terminal connected to an output terminal for outputting the output voltage Vout.

The control circuit 40 has a function, i.e., an output feedback control function, to control the half-bridge drive circuits 21 and 22 for bringing the output voltage Vout into agreement with a desired target value, for example. The control circuit 40 with such a function is able to stably supply a constant output voltage Vout to the load Z. An existing pulse width modulation process, an existing frequency modulation process, an existing phase modulation process, or the like may be applied as the output feedback control process.

The capacitor 61 is connected parallel to the DC power supply E1 and functions as an input filter capacitor for removing a noise component of the input voltage Vin.

The capacitor 66 is connected between an output terminal of the half-bridge drive circuit 21 and a first terminal of the primary winding L1, and functions as a resonant capacitor. The capacitor 66 may also be called simply as a capacitor in a case where the capacitance value of the capacitor 66 is large compared with the respective operation frequencies of the half-bridge drive circuits 21 and 22.

The capacitor 67 is connected parallel to the load Z and functions as an output capacitor for smoothing the output voltage Vout.

Although not illustrated in FIG. 10, the switched-mode power supply 1 may have a starter circuit that pre-charges the capacitor 67 upon startup.

Operation of the switched-mode power supply 1 will be described below. When the DC power supply E1 is turned on, the input voltage Vin is applied to the capacitor 61 and the half-bridge drive circuits 21 and 22. The half-bridge drive circuits 21 and 22 apply pulsed voltages to the primary winding L1 of the transformer 10, causing the secondary winding L2 to generate a pulsed induced voltage thereacross.

Providing a positive induced voltage is generated across the secondary winding L2, for example, electric charges are stored in the capacitor 67 via the diode 37, the balancing coil 38, and the rectifying coil 39. On the other hand, providing a negative induced voltage is generated across the secondary winding L2, electric charges are stored in the capacitor 67 via the diode 36, the balancing coil 38, and the rectifying coil 39.

The above sequence of operation is repeated to cause the rectifying circuit 30 to perform full-wave rectification, i.e., bidirectional rectification, on the pulsed induced voltage generated across the secondary winding L2.

In FIG. 10, the primary circuit system is of a full-bridge configuration. However, the primary circuit system may be of a half-bridge configuration as is the case with the first embodiment. The switched-mode power supply 1 may also operate as a resonant power supply circuit with a transformer leakage inductance and a resonant coil added thereto.

Eleventh Embodiment

Figure 11:
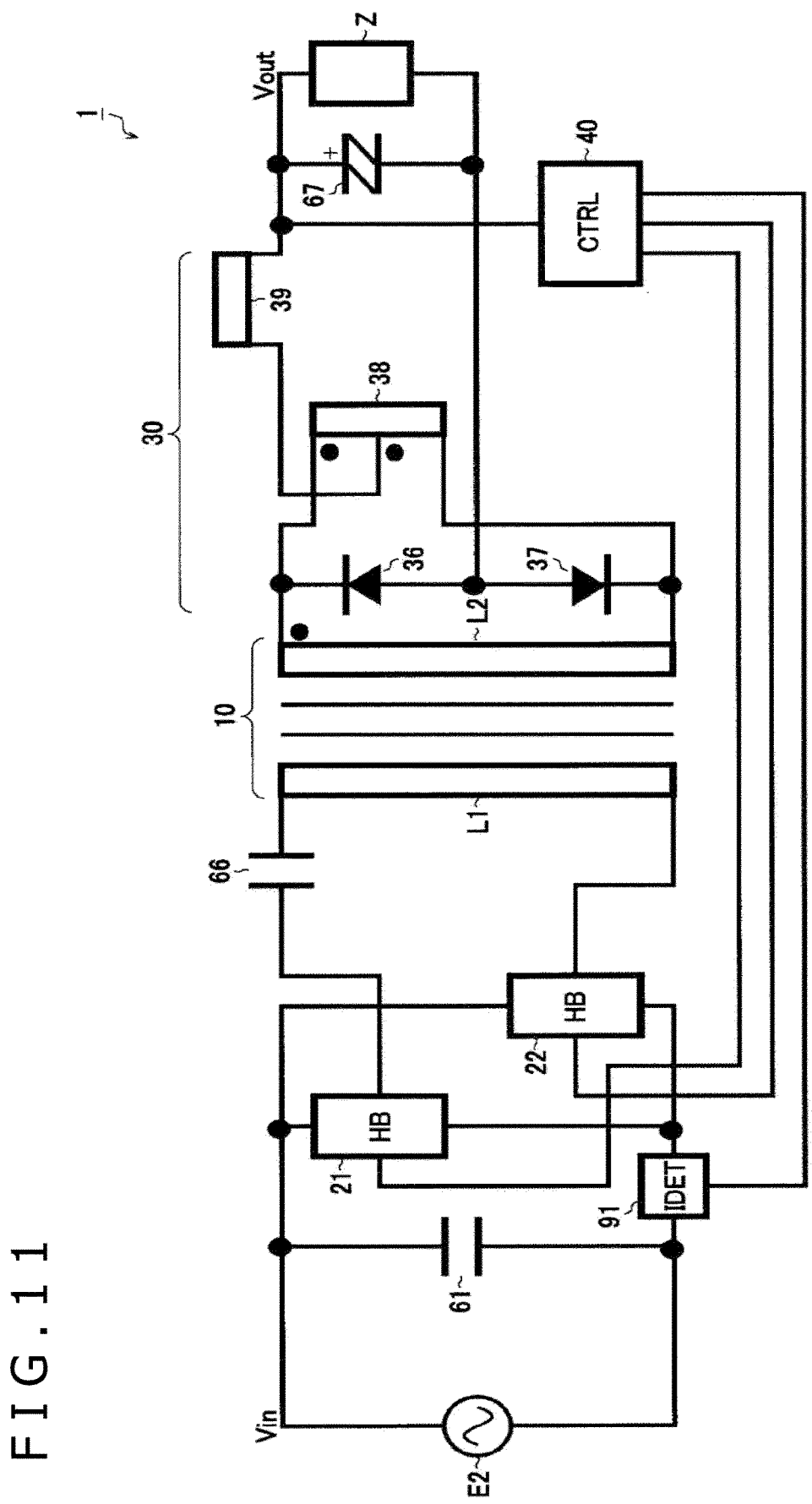
FIG. 11 is a circuit diagram, partly in block form, of a switched-mode power supply according to an eleventh embodiment of the present disclosure.

FIG. 11 illustrates, partly in block form, a switched-mode power supply 1 according to an eleventh embodiment of the present disclosure. As illustrated in FIG. 11, the switched-mode power supply 1 according to the eleventh embodiment is based on the tenth embodiment (FIG. 10) with an AC power supply E2 connected in place of the DC power supply E1.

Specifically, the switched-mode power supply 1 according to the eleventh embodiment is an insulated AC/DC converter with a primary circuit system and a secondary circuit system that are electrically insulated from each other, for converting an input voltage Vin supplied from the AC power supply E2 into an output voltage Vout and supplying the output voltage Vout to a load Z.

In order to allow the switched-mode power supply 1 to operate with the AC power supply E2, the half-bridge drive circuits 21 and 22 should be made compatible with input voltages Vin in the positive and negative bidirectional directions.

A current detecting device 91 is connected between the half-bridge drive circuits 21 and 22 and the AC power supply E2. According to a current feedback control process using the current detecting device 91, the control circuit 40 makes it possible to control a harmonic current as well as to improve the power factor and perform overcurrent protection.

Twelfth Embodiment

Figure 12:
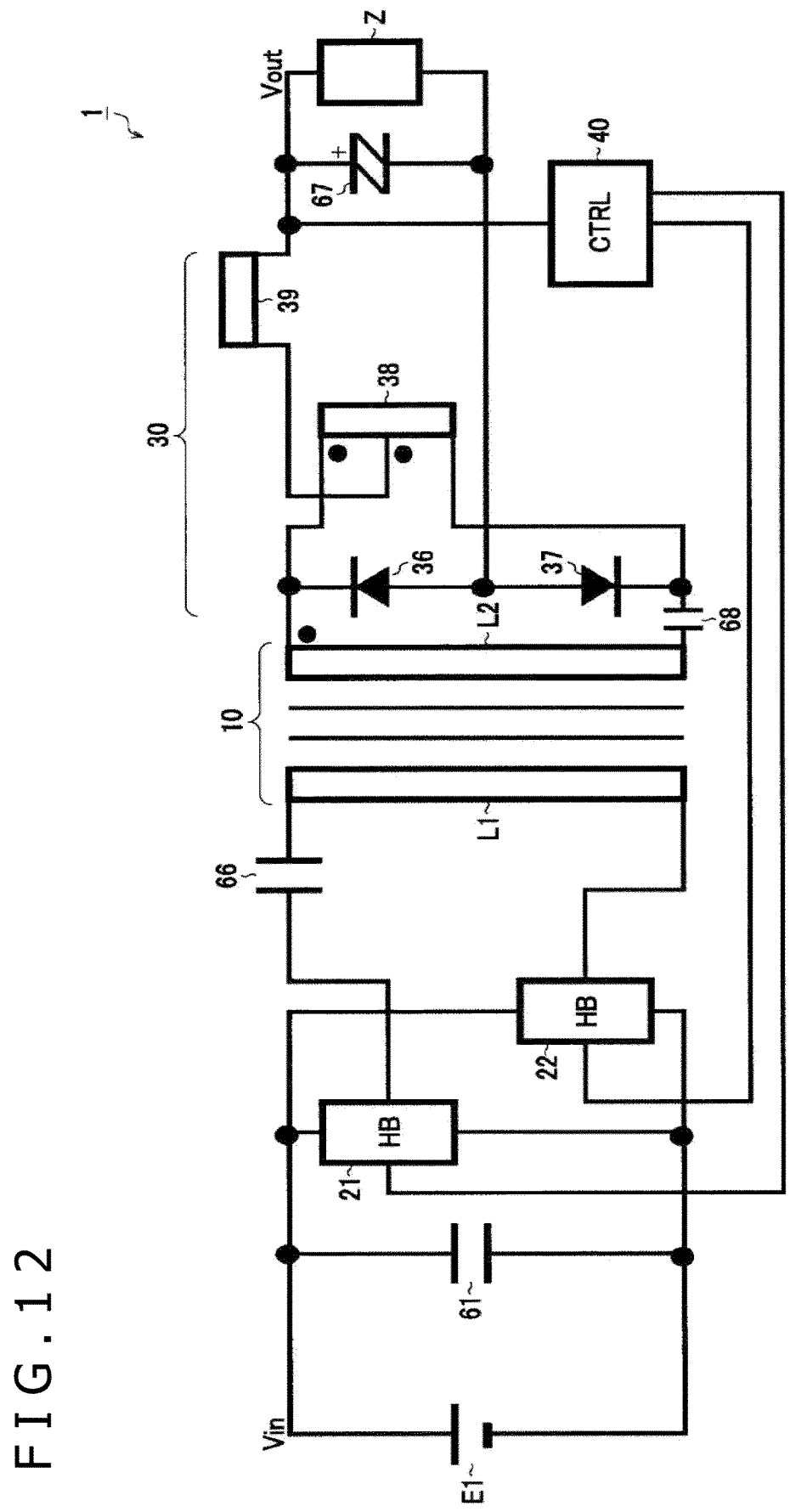
FIG. 12 is a circuit diagram, partly in block form, of a switched-mode power supply according to a twelfth embodiment of the present disclosure.

FIG. 12 illustrates, partly in block form, a switched-mode power supply 1 according to a twelfth embodiment of the present disclosure. As illustrated in FIG. 12, the switched-mode power supply 1 according to the twelfth embodiment is based on the tenth embodiment (FIG. 10) with a capacitor 68 added. The capacitor 68 may be included in a closed circuit including the secondary winding L2 and the balancing coil 38, i.e., between a second terminal of the secondary winding L2 and a second terminal of the balancing coil 38. With this configuration, since the capacitor 68 is able to cut off the closed circuit in terms of direct currents, it is possible to prevent direct currents flowing in the closed circuit.

Thirteenth Embodiment

Figure 13:
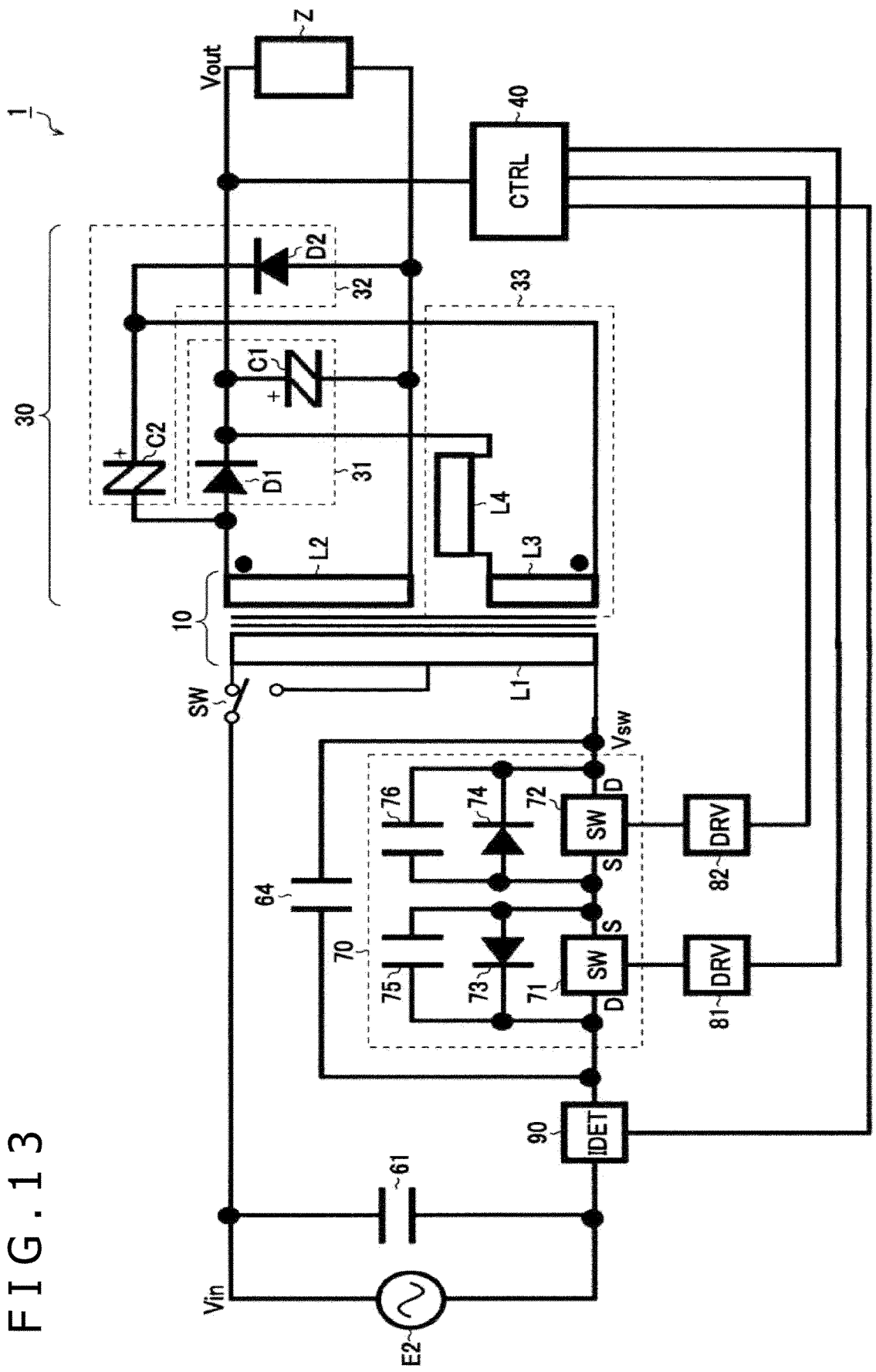
FIG. 13 is a circuit diagram, partly in block form, of a switched-mode power supply according to a thirteenth embodiment of the present disclosure.

FIG. 13 illustrates, partly in block form, a switched-mode power supply 1 according to a thirteenth embodiment of the present disclosure. As illustrated in FIG. 13, the switched-mode power supply 1 according to the thirteenth embodiment incorporates the primary circuit system according to the eighth embodiment (FIG. 8) and the secondary circuit system according to the second embodiment (FIG. 2), with the connection coil L4 changed in a connected position.

More specifically, the connection coil L4 is connected, not between the second rectifying section 32, i.e., the connection node between the diode D2 and the capacitor C2, and the second terminal of the auxiliary winding L3, but between the first rectifying section 31, i.e., the connection node between the diode D1 and the capacitor C1, and the first terminal of the auxiliary winding L3.

According to the present embodiment, even if the induced voltages generated respectively across the secondary winding L2 and the auxiliary winding L3 are different from each other, it is possible to limit a short-circuiting pulsed current due to the voltage difference, thereby restraining heating of the transformer 10. This feature is similar to the second embodiment (FIG. 2) referred to above.

In a basic circuit for the application of an AC voltage, either one of the selector switch SW of the primary circuit system and the connection coil L4 of the secondary circuit system may be omitted. In view of this, a combination of the primary circuit system according to the seventh embodiment (FIG. 7) and the secondary circuit system according to the first embodiment (FIG. 1) is simplest, and this combination can be understood as a basic circuit for the application of an AC voltage.

Fourteenth Embodiment

Figure 14:
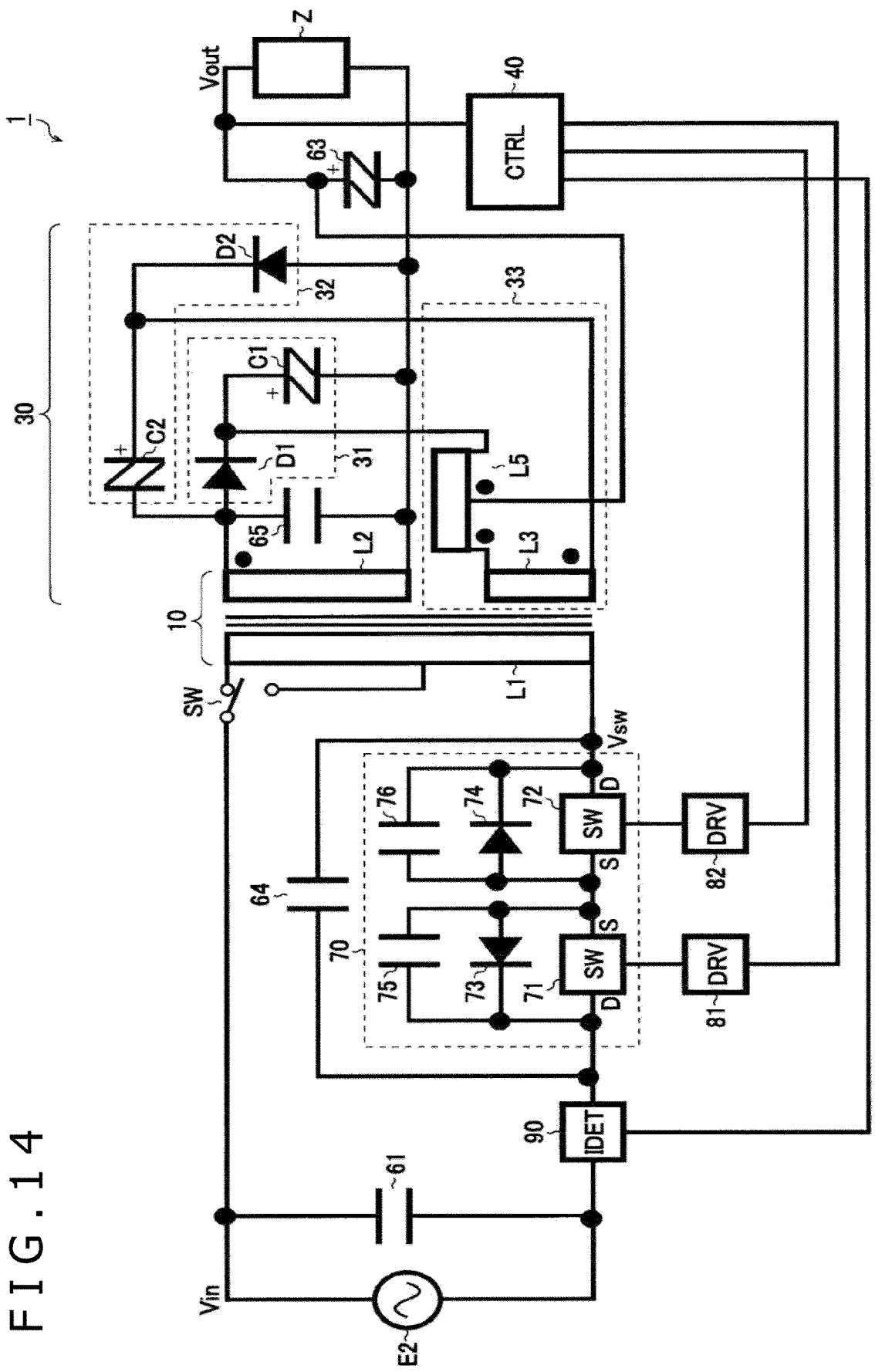
FIG. 14 is a circuit diagram, partly in block form, of a switched-mode power supply according to a fourteenth embodiment of the present disclosure.
Figure 15:
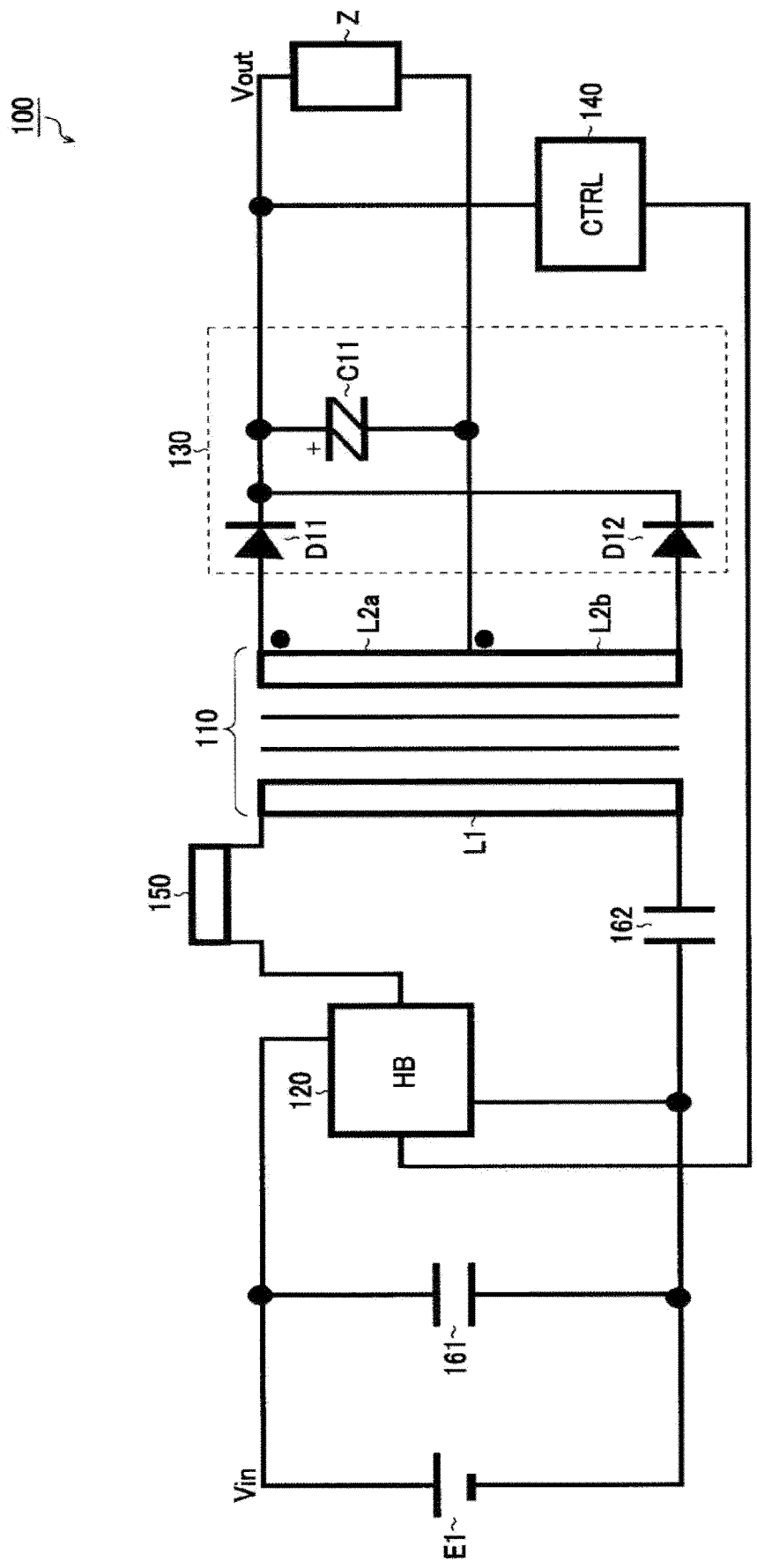
FIG. 15 is a circuit diagram, partly in block form, of an existing switched-mode power supply.

FIG. 14 illustrates, partly in block form, a switched-mode power supply 1 according to a fourteenth embodiment of the present disclosure. As illustrated in FIG. 14, the switched-mode power supply 1 according to the fourteenth embodiment is based on the eighth embodiment (FIG. 8) with the balancing coil L5 changed in a connected position.

More specifically, the balancing coil L5 is connected, not between the second rectifying section 32, i.e., the connection node between the diode D2 and the capacitor C2, and the second terminal of the auxiliary winding L3, but between the first rectifying section 31, i.e., the connection node between the diode D1 and the capacitor C1, and the first terminal of the auxiliary winding L3. The technical significance of the balancing coil L5 thus connected will be described below.

First, it is assumed that the balancing coil L5 is connected between the second rectifying section 32 and the second terminal of the auxiliary winding L3, a configuration corresponding to the eighth embodiment (FIG. 8). In this case, the potential at the first terminal of the balancing coil L5, i.e., the terminal thereof that is connected to the second rectifying section 32, fluctuates largely. This is because the connection node between the diode D2 and the capacitor C2 is not connected to the capacitor 63, i.e., the output smoothly capacitor, and the potential at the connection node fluctuates largely. On the other hand, since the midpoint tap of the balancing coil L5 is connected to the capacitor 63, any fluctuations of the potential at the midpoint tap are relatively small. Therefore, the potential at the second terminal of the balancing coil L5, i.e., the terminal thereof connected to the second terminal of the auxiliary winding L3, fluctuates largely as with the potential at the first terminal of the balancing coil L5.

In a case where the balancing coil L5 is connected between the second rectifying section 32 and the second terminal of the auxiliary winding L3 as described above, as the potentials at the first and second terminals of the balancing coil L5 fluctuate largely, the balancing coil L5 has to be a coil having a large inductance so that it will not be saturated.

Then, it is assumed that the balancing coil L5 is connected between the first rectifying section 31 and the first terminal of the auxiliary winding L3, a configuration corresponding to the thirteenth embodiment (FIG. 13). In this case, the potential at the first terminal of the balancing coil L5, i.e., the terminal thereof that is connected to the first rectifying section 31, fluctuates to a relatively small degree. This is because whereas the potential appearing at the connection node between the diode D1 and the capacitor C1 is equal to the potential appearing at the second terminal of the secondary winding L2 via the capacitor C1 in terms of high frequencies, the second terminal of the secondary winding L2 is connected to the capacitor 63, i.e., the output smoothing capacitor, and hence the potential at the second terminal of the secondary winding L2 fluctuates to a relatively small degree. Furthermore, since the midpoint tap of the balancing coil L5 is also connected to the capacitor 63, any fluctuations of the potential at the midpoint tap are relatively small. Consequently, any fluctuations of the potential at the second terminal of the balancing coil L5, i.e., the terminal thereof that is connected to the first terminal of the auxiliary winding L3, are relatively small as with fluctuations of the potential at the first terminal of the balancing coil L5.

In a case where the balancing coil L5 is connected between the first rectifying section 31 and the first terminal of the auxiliary winding L3 as described above, as the potentials at the first and second terminals of the balancing coil L5 fluctuate to a relatively small degree, the balancing coil L5 can be a coil having a large inductance because it may not be necessary to consider saturation of the balancing coil L5.

Other Modifications

The various technical features disclosed in the present description may be changed or modified in various ways as well as exemplified with the above embodiments without departing from the scope of the present disclosure. The above embodiments should be construed as illustrative, but not limitative, in all aspects, and the scope of the present disclosure should not be limited by the above embodiments, but should be understood as being equivalent to the scope of the appended claims and to all changes and modifications covered by the scope of the appended claims.

The rectifying circuits disclosed in the present description can be used as a secondary-side rectifying unit in an insulated switched-mode power supply, for example.

What is claimed is:

1. A rectifying circuit, comprising:
   a first rectifying section for rectifying a positive induced voltage generated across a secondary winding of a transformer;
   a second rectifying section for rectifying a negative induced voltage generated across the secondary winding; and
   an inductance section connected between the first rectifying section and the second rectifying section, wherein the inductance section includes an auxiliary winding coupled to a primary winding of the transformer.

2. The rectifying circuit according to claim 1, wherein a degree of coupling between the primary winding and the auxiliary winding is smaller than a degree of coupling between the primary winding and the secondary winding.

3. The rectifying circuit according to claim 1, wherein the inductance section includes a connection coil for limiting a short-circuiting current flowing through the auxiliary winding.

4. The rectifying circuit according to claim 3, wherein the connection coil includes a balancing coil having a midpoint tap connected to an output terminal for outputting an output voltage.

5. The rectifying circuit according to claim 1, wherein the inductance section includes a connection coil not coupled to the primary winding of the transformer.

6. The rectifying circuit according to claim 1, wherein
the first rectifying section includes:
a first rectifying device having a first terminal connected to a first terminal of the secondary winding and a second terminal connected to a first terminal of the inductance section; and
a first capacitor having a first terminal connected to the first terminal of the inductance section and a second terminal connected to a second terminal of the secondary winding, and
the second rectifying section includes:
a second rectifying device having a first terminal connected to the second terminal of the secondary winding and a second terminal connected to a second terminal of the inductance section; and
a second capacitor having a first terminal connected to the second terminal of the inductance section and a second terminal connected to the first terminal of the secondary winding.

7. The rectifying circuit according to claim 6, further comprising a third capacitor connected in series between the secondary winding, and the first rectifying section and the second rectifying section.

8. The rectifying circuit according to claim 3, wherein
the first rectifying section includes:
a first rectifying device having a first terminal connected to a first terminal of the secondary winding; and
a first capacitor having a first terminal connected to a second terminal of the first rectifying device and a second terminal connected to a second terminal of the secondary winding,
the second rectifying section includes:
a second rectifying device having a first terminal connected to the second terminal of the secondary winding; and
a second capacitor having a first terminal connected to a second terminal of the second rectifying device and a second terminal connected to the first terminal of the secondary winding,
the connection coil includes:
a first terminal connected to the second terminal of the first rectifying device and the first terminal of the first capacitor; and
a second terminal connected to a first terminal of the auxiliary winding, and
the auxiliary winding has a second terminal connected to the second terminal of the second rectifying device and the first terminal of the second capacitor.

9. The rectifying circuit according to claim 4, wherein
the first rectifying section includes:
a first rectifying device having a first terminal connected to a first terminal of the secondary winding; and
a first capacitor having a first terminal connected to a second terminal of the first rectifying device and a second terminal connected to a second terminal of the secondary winding,
the second rectifying section includes:
a second rectifying device having a first terminal connected to the second terminal of the secondary winding and a second capacitor having a first terminal connected to a second terminal of the second rectifying device; and
a second terminal connected to the first terminal of the secondary winding,
the balancing coil has:
a first terminal connected to the second terminal of the first rectifying device and the first terminal of the first capacitor; and
a second terminal connected to a first terminal of the auxiliary winding,
the auxiliary winding has a second terminal connected to the second terminal of the second rectifying device and the first terminal of the second capacitor,
the midpoint tap of the balancing coil is connected to a first terminal of an output smoothing capacitor and the output terminal for outputting the output voltage, and
the second terminal of the secondary winding is connected to a second terminal of the output smoothing capacitor.

10. A rectifying circuit, comprising:
a pair of rectifying devices reverse-connected in series across a secondary winding of a transformer;
a balancing coil connected parallel to the pair of rectifying devices; and
a rectifying coil connected to a midpoint tap of the balancing coil.

11. The rectifying circuit according to claim 10, further comprising a capacitor for cutting off a closed circuit including the secondary winding and the balancing coil, in terms of direct currents.

12. A switched-mode power supply, comprising:
a transformer having a primary winding and a secondary winding;
a drive circuit for switchingly driving the primary winding of the transformer; and
a rectifying circuit including:
a first rectifying section for rectifying a positive induced voltage generated across the secondary winding of the transformer;
a second rectifying section for rectifying a negative induced voltage generated across the secondary winding; and
an inductance section connected between the first rectifying section and the second rectifying section, wherein
the inductance section includes an auxiliary winding coupled to the primary winding of the transformer, and
the rectifying circuit being connected to the secondary winding of the transformer.

* * * * *